(12) United States Patent
Bourdel

(10) Patent No.: US 6,513,580 B1
(45) Date of Patent: Feb. 4, 2003

(54) HEAT EXCHANGER, IN PARTICULAR FOR PREHEATING LIQUID MANURE

(75) Inventor: Jacques Bourdel, Saint-Martin-D'Uriage (FR)

(73) Assignee: Sirven, Lesneven (FR)

( * ) Notice: Subject to any disclaimer, the term of this patent is extended or adjusted under 35 U.S.C. 154(b) by 0 days.

(21) Appl. No.: 09/889,264

(22) PCT Filed: Dec. 24, 1999

(86) PCT No.: PCT/FR99/03284

§ 371 (c)(1),
(2), (4) Date: Jul. 13, 2001

(87) PCT Pub. No.: WO00/41793

PCT Pub. Date: Jul. 20, 2000

(30) Foreign Application Priority Data

Jan. 14, 1999 (FR) .............................. 99 00655

(51) Int. Cl.$^7$ ............................... F28F 7/10; C02F 1/02
(52) U.S. Cl. ........................................ 165/120
(58) Field of Search ................................ 165/120, 154, 165/156; 34/180

(56) References Cited

U.S. PATENT DOCUMENTS

| | | | | |
|---|---|---|---|---|
| 305,142 A | * | 9/1884 | Burckhardt | ................... 15/179 |
| 922,898 A | | 5/1909 | Hiller | |
| 945,109 A | * | 1/1910 | Du Pont | ..................... 165/120 |
| 1,634,714 A | | 12/1927 | Hiller et al. | |
| 2,727,316 A | * | 12/1955 | Naselli | ........................ 34/129 |
| 2,841,497 A | * | 7/1958 | Carcassonne-Leduc | .. 165/109.1 |
| 2,985,435 A | * | 5/1961 | Gross | .......................... 165/156 |
| 3,080,150 A | * | 3/1963 | Gross | ......................... 159/11.1 |
| 3,545,063 A | * | 12/1970 | Mitchell | ...................... 165/156 |
| 3,625,273 A | | 12/1971 | Buschor | |
| 5,256,707 A | | 10/1993 | Casper et al. | |
| 5,287,687 A | * | 2/1994 | Urich et al. | ............... 56/327.1 |

FOREIGN PATENT DOCUMENTS

| | | |
|---|---|---|
| CH | CH 282725 | 5/1952 |
| DE | DE 3615873 C1 | 5/1987 |

* cited by examiner

*Primary Examiner*—Allen Flanigan
(74) *Attorney, Agent, or Firm*—McCormick, Paulding & Huber LLP

(57) ABSTRACT

A heat exchanger for using a hot liquid to warm a cold substance that is fluid and foamy, containing solid particles and gas, such as liquid manure. The invention is characterized in that it comprises a plurality of unit heat exchangers (1) connected in series, each constituted by a horizontal tube (2) having a heat conducting wall, in which the substance is caused to circulate from one end to the other, and a concentric tubular case (3) surrounding said tube (2) in which the hot liquid is caused to circulate from one end to the other in the opposite direction to the circulation of said substance, and that inside said tube (2) there is coaxially mounted a rotary shaft (4) carrying a helical brush (40) forming an Archimedes' screw thread that rubs against the inside wall of the tube (2) to ensure that the substance is transported therealong. Said heat exchanger is particularly useful for preheating liquid manure in a dehydration installation.

10 Claims, 3 Drawing Sheets

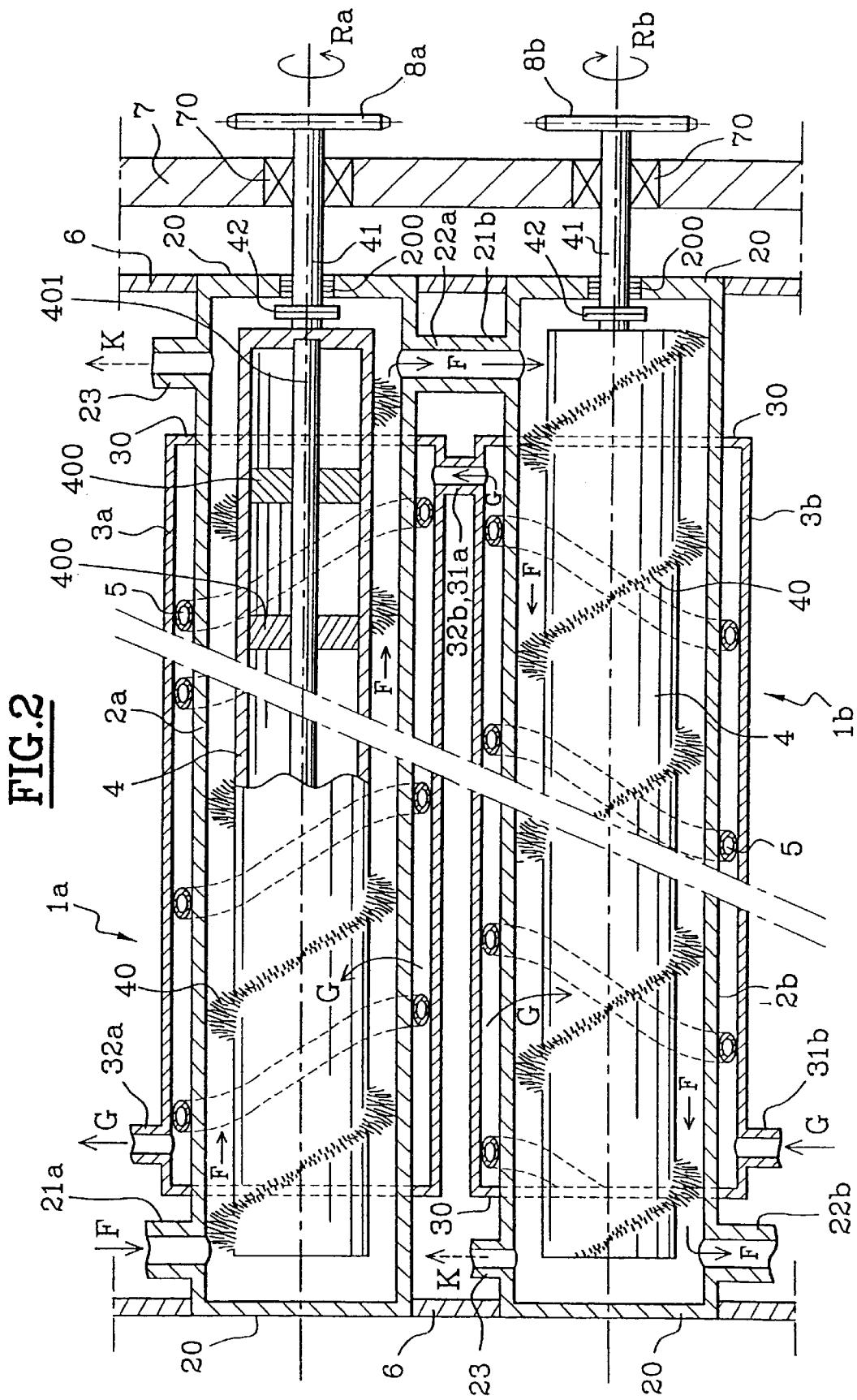

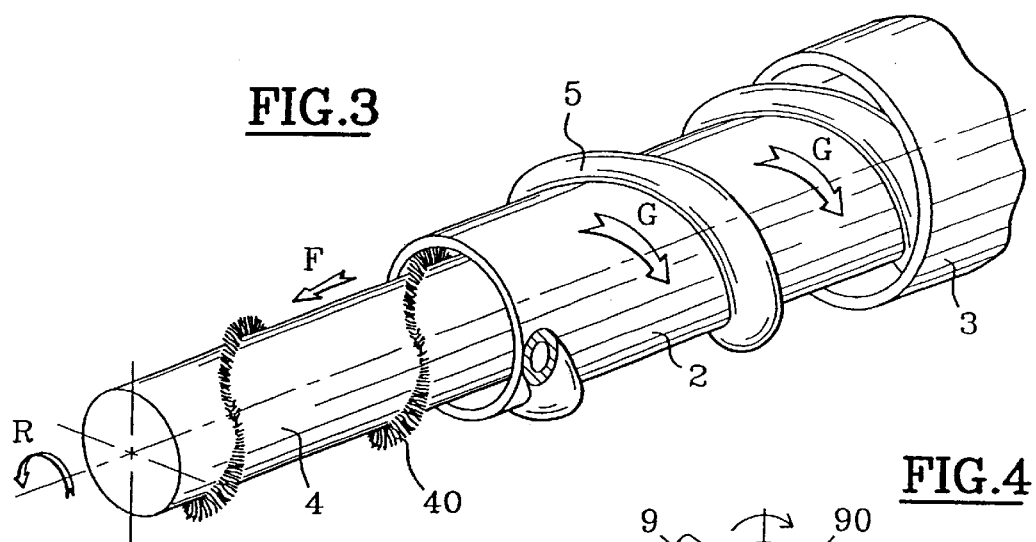
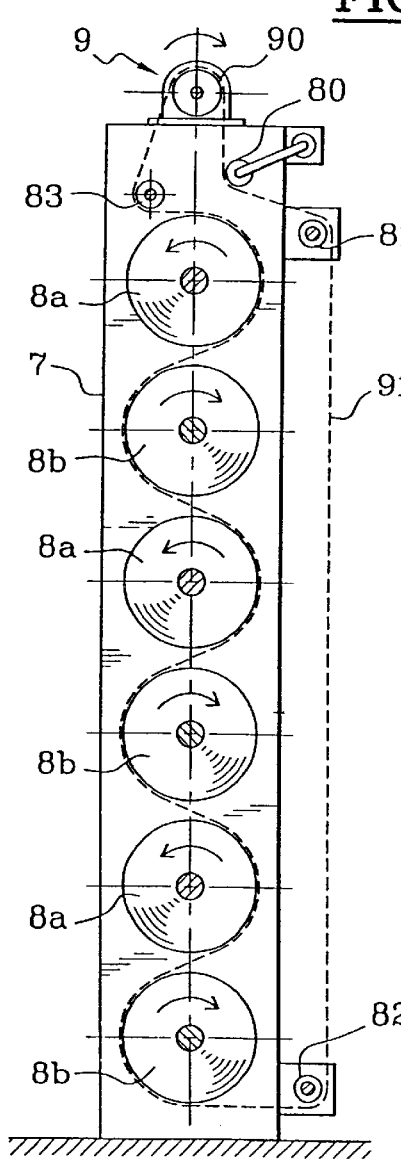

HEAT EXCHANGER, IN PARTICULAR FOR PREHEATING LIQUID MANURE

BACKGROUND OF THE INVENTION

The present invention relates to a heat exchanger, and more particularly to a heat exchanger for using a hot liquid to warm a substance that is cold, fluid, and foamy, and that contains solid particles and gas.

The invention has been designed in the context of a particular application, specifically that of treating animal excreta, and more particularly pig manure, in an installation for dehydrating liquid manure.

By way of example, an installation of this type is described in international patent application WO 93/16005 in the name of the Applicant, to which reference can be made where necessary.

SUMMARY OF THE INVENTION

In the installation constituting the subject matter of that patent application, the substance for treatment is spread out continuously in the form of a thin layer on the top face of a heat exchanger wall which is heated to a temperature that is high enough to cause the volatile components contained in the substance, and in particular the water, to evaporate quickly; the solid and dry residue is removed as it forms on said face by scraping; the heat exchanger surface is heated by means of steam that results from evaporation, the steam being compressed mechanically and then put into contact with the bottom face of the wall so as to condense thereon, the distillate subsequently being removed.

That extraction method is particularly low in cost because the energy released by the condensation is used on the other side of the heat exchanger wall for evaporation.

In order to further improve the thermal efficiency of the method, it is advantageous to preheat the substance that is to be treated, specifically liquid manure, prior to bringing it to the evaporator, and to do so using the hot distillate that comes from the evaporator.

It is in that context that the present invention has been developed, the heat exchanger being intended to preheat the liquid manure that is to be dehydrated by evaporation, the hot liquid used for preheating being the distillate produced by the dehydration treatment.

The design of such a heat exchanger has encountered technical difficulties which are associated with the very peculiar nature of liquid manure.

Liquid manure is a fluid, semiliquid substance having the consistency of slurry containing solid particles and gas, and it is extremely foamy or frothy. It comprises a medium which is entirely heterogeneous, containing heavy materials which settle quickly and light materials which tend to float; this substance is the seat of very significant outgassing during warming, with the volume of gas produced—essentially carbon dioxide ($CO_2$)—being two to ten times greater than the volume of the manure; foam is also formed in large quantities, in a medium which is highly aggressive.

Tests were initially made using conventional type heat exchangers and they did not give satisfaction, with faulty operation being observed very quickly, due in particular to ducts becoming clogged.

The present invention seeks to resolve those difficulties by proposing a heat exchanger of the above-mentioned type which is adapted to warming a foamy semiliquid substance containing solid particles and gas, in particular such as liquid manure, the heat exchanger nevertheless being simple in design technically speaking and of moderate cost price, easy to maintain, and capable of operating under satisfactory conditions concerning reliability, throughput, and efficiency.

These various objectives are achieved by the fact that the heat exchanger of the present invention comprises a plurality of unit heat exchangers connected in series, each constituted by a horizontal tube having a heat conducting wall, in which the substance is caused to circulate from one end to the other, and a concentric tubular case surrounding said tube in which the hot liquid is caused to circulate from one end to the other in the opposite direction to the circulation of said substance, and that inside said tube there is coaxially mounted a rotary shaft carrying a helical brush forming an Archimedes' screw thread that rubs against the inside wall of the tube to ensure that the substance is transported therealong.

Furthermore, according to various additional but non-limiting characteristics of the invention:

said unit heat exchangers are disposed substantially in a common vertical plane one above another, with the substance circulating downwards, i.e. from the top unit heat exchanger to the bottom unit heat exchanger of the series, while the hot liquid circulates in the opposite direction, i.e. upwards;

the downstream end of said tube has a gas removal fitting;

said rotary shaft is mounted inside the tube via a floating mount, the shaft being centered automatically within the tube by the helical brush bearing against the inside wall of the tube;

the shaft is rotated by means of a coupling member which leaves the shaft with a certain amount of freedom to move radially;

a helical gasket is interposed between the tube and its case so as to channel the hot liquid and cause it to circulate in the form of a helical sheet;

said gasket is an inflatable tube of synthetic rubber;

all of the helical brushes have screw pitches with the same handedness, while pairs of adjacent shafts are rotated in opposite directions; and each of the shafts carries a driving sprocket, all of the shafts being driven by a motor via a chain engaging the set of sprockets.

In one possible application of the invention, the heat exchanger is for preheating liquid manure that is to be dehydrated by evaporation, the hot liquid being the distillate produced by the dehydration treatment.

Other characteristics and advantages of the invention appear from the following description and the accompanying drawings which show a preferred embodiment merely by way of non-limiting example.

BRIEF DESCRIPTION OF THE DRAWINGS

In the drawings:

FIG. 2 is a fragmentary diagrammatic view in section on a vertical plane showing a heat exchanger of the invention;

FIG. 3 is a partially cutaway diagrammatic perspective view of a unit heat exchanger forming part of said heat exchanger; and FIG. 4 is a diagrammatic side view of the heat exchanger, said view showing how the helical brushes of the heat exchanger are driven.

BRIEF DESCRIPTION OF PREFERRED EMBODIMENTS

Figure 1:
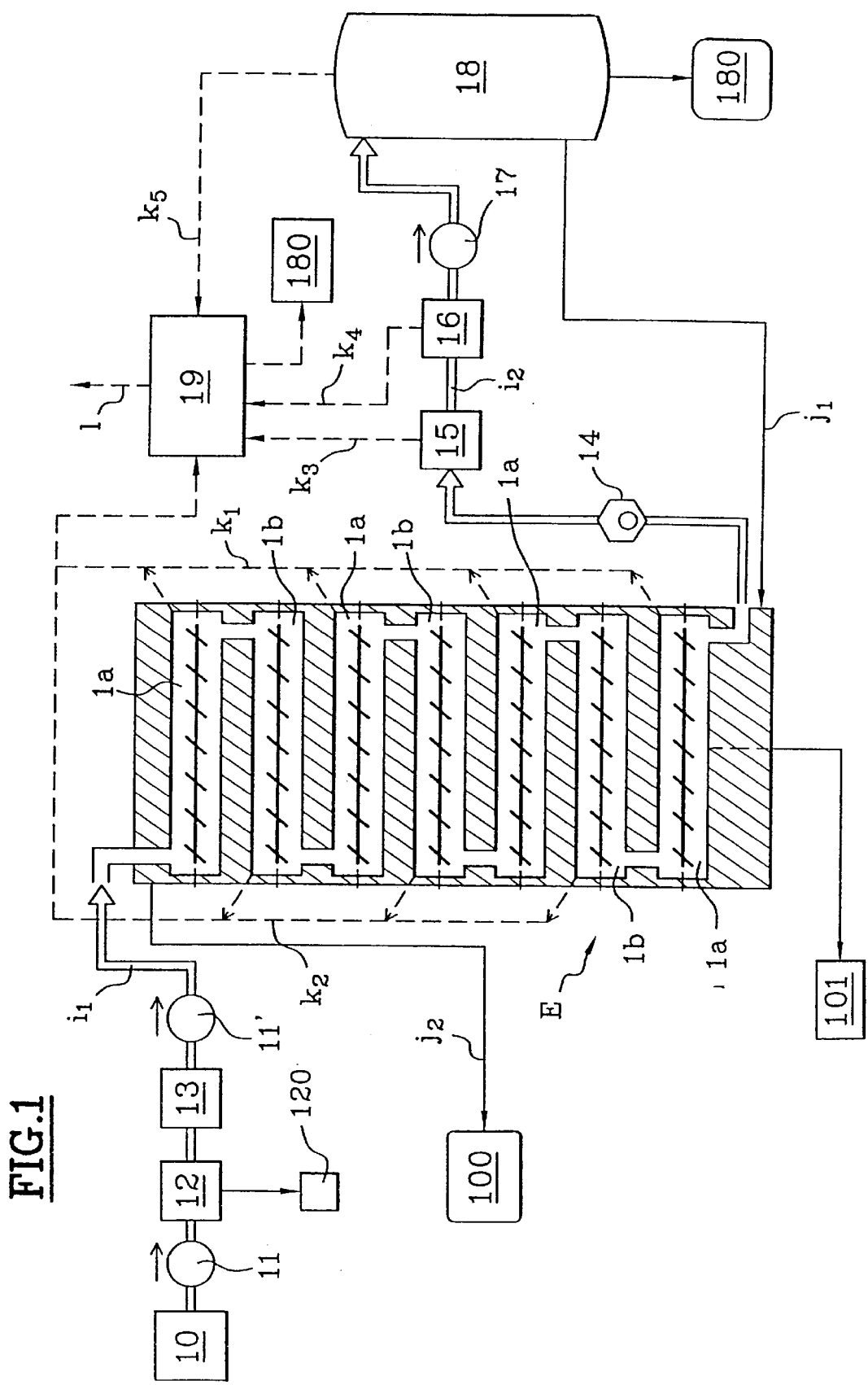
FIG. 1 is an overall diagrammatic view of a manure dehydration installation including a heat exchanger of the invention.

The installation shown in FIG. 1 for dehydrating an aqueous substance, such as liquid manure, includes a heat exchanger of the invention given reference E and represented by shading.

The function of this heat exchanger is to warm a fluid substance, in particular pig manure, coming from a storage tank 10, e.g. situated on premises where pigs are farmed.

Ducts represented by bold lines in the figure and given respective references $i_1$ and $i_2$ represent respectively ducts for bringing cold manure into the heat exchanger E and for removing warm manure from the heat exchanger and taking it to dehydrator apparatus 18.

Ducts for bringing hot distillate from the dehydrator 18 to the heat exchanger E and for removing cooled distillate to a storage location 100 are represented by fine lines given respective references $j_1$ and $j_2$.

The various ducts for removing and transferring gas to purifier apparatus 19 are represented by dashed lines k.

References 11 and 11' on the manure feed duct $i_1$ designate pumps for causing the manure to move along the ducts, and references 12 and 13 designate grinding and mixing vessels respectively.

The function of these devices is to make the manure as homogenous and as fluid as possible, so that it flows properly through the heat exchanger.

Where necessary, suitable additives can be introduced into the vessels 12 and 13 to further improve such fluidification.

The grinder vessel is advantageously fitted with a screen whose function is to retain certain solids, in particular hairs, to enable them to be removed and recovered subsequently in a device 120.

It is thus relatively homogeneous manure that is fed by the duct $i_1$ to the heat exchanger E.

By way of example, this manure may be at a temperature of about 10° C.

According to a characteristic of the invention, the heat exchanger E comprises a plurality of unit heat exchangers connected in series and constituting manure transfer ducts; these ducts 1 are disposed horizontally one above another, and they lie substantially in a single vertical plane. The heat exchanger E is thus generally in the form of a vertical wall.

The cold manure is delivered into the top unit heat exchanger of the assembly; it travels successively through the underlying heat exchangers, as in a zigzag heat exchanger coil, and it leaves via the bottom unit heat exchanger.

The manure thus travels in opposite directions in two adjacent unit heat exchangers.

In FIG. 1, references 1a designate the unit heat exchangers in which the manure travels from left to right, and 1b the unit heat exchangers in which the manure travels from right to left.

On reaching the downstream end of a unit heat exchanger 1, the manure flows under gravity into the upstream end of the following unit heat exchanger.

As explained in greater detail below, while it is being transferred within the heat exchanger E, the manure is warmed progressively by the distillate that results from the evaporation treatment, which distillate flows as a counter-flow to the manure through the heat exchanger so as to transfer a fraction of its heat thereto.

The warmed manure leaves through the bottom of the heat exchanger and is taken to the dehydrator 18 by a duct $i_2$ having in succession thereon: a head loss device 14, a degassing vessel 18, a defoaming vessel 16, and a transfer pump 17.

The presence of the pump 11' at the inlet to the heat exchanger E, and the presence of the head loss device 14 at the outlet therefrom have the effect of raising the pressure of the manure inside the heat exchanger, and thus of reducing the volume of the bubbles and the foam it produces, while also increasing the heat exchange coefficient.

The function of the vessels 15 and 16 is to keep stirring the warm manure for several hours so as to slow down foam production and extract as much as possible of certain gases present in the manure, and in particular ammonia; suitable additives can advantageously be introduced into the vessels to improve the defoaming and degassing treatments.

The gases coming from the vessels 15 and 16 are removed by ducts $k_3$ and $k_4$ respectively leading to a treatment device 19.

The dehydrator 18, which is of the same type as that described in above-mentioned Wo 93/16005, for example, serves to treat the warm manure supplied by the duct $i_2$ and it produces a dry powdery substance, which is recovered at 180.

This device also produces a hot (liquid) distillate, whose temperature is about 110° C., for example, which distillate is taken by the pipe $j_1$ to the heat exchanger E. Finally, the dehydrator 18 produces undesirable gases which are removed via the duct $k_5$ to the purifier 19.

As already mentioned, the hot distillate is introduced into the bottom of the heat exchanger E; as explained below, in particular with reference to FIGS. 2 and 3, the distillate flows as a countercurrent to the manure through the heat exchanger; it travels in succession through the series of unit heat exchangers 1a and 1b from the bottom upwards. The cooled distillate leaves the heat exchanger via a pipe $j_2$ and is taken to a storage tank 100.

It will also be observed that at the downstream end (in the manure travel direction) of each individual duct 1a or 1b, any gas that has formed in the unit heat exchanger from bubbles present in the manure is recovered and removed via a pipe $k_1$ or $k_2$, respectively, to the purifier 19.

After undesirable gas and vapor has been treated, non-polluting gas can be delivered to the atmosphere via a pipe 1.

The structure and the operation of the heat exchanger E is described below with reference to FIGS. 2 to 4.

The number of individual ducts constituting the heat exchanger can be six, for example. Only two superposed unit heat exchangers are shown in FIG. 2.

Each unit heat exchanger 1 is constituted essentially by a cylindrical tube 2 having a rotary shaft 4 mounted therein and having a likewise cylindrical and tubular case 3 mounted concentrically outside the tube.

Each of the tubes 2 has end walls 20 which engage in corresponding openings formed in vertical plates 6.

The tubes 2 are fixed to the plates 6 by suitable means (not shown) e.g. by means of bolts or welding.

Each tube 2 has an inlet fitting 21 at an "upstream" one of its ends and an outlet fitting 22 at a "downstream" one of its ends.

The inlet fittings 21 face upwards while the outlet fittings 22 face downwards.

The outlet fitting of the tube 2a is connected to the underlying inlet fitting of the following tube 2b.

In FIG. 2, arrows F represent manure flow through two successive tubes 2a and 2b.

The cases 3 surrounding the tubes 2 carry the hot distillate which flows as a countercurrent to the manure.

These cases are provided at respective ends with distillate inlet and outlet fittings given respective references 31 and 32. In a configuration that is inverted relative to the fittings of the tube 2, the inlet fittings 31 face downwards and the outlet fittings face upwards, so the outlet fittings 32b of a case 3b is connected to the inlet fitting 31a of the following case 3a situated above it.

Manure enters into a case 3 via the downstream end of the tube 2, and it leaves via its upstream end.

The tubes 2 are made of a material which is a good conductor of heat, so as to allow heat to be transferred well from the distillate flowing in the case 3 to the manure flowing in the tube 2.

In practice, the tubes 2 and 3 can be made of stainless steel which, while conducting heat adequately, is also good at withstanding chemical attack from the highly aggressive manure.

Distillate flow is represented by arrows G in FIG. 2.

The shaft 4 consists in a cylindrical tube which is advantageously made of stainless steel, having a diameter that is slightly smaller than the inside diameter of the tube 2 in which it is received.

This tube has helically wound thereon a brush 40 made of flexible synthetic material bristles that withstand corrosion from manure; for example the bristles can be polyamide fibers having a diameter of about 0.4 millimeters (mm) and extending radially, with the entire set of fibers being wound helically on the tubular shaft, e.g. at a pitch of 150 mm.

By way of indication, the inside diameter of the tube 2 is about 200 mm while the outside diameter of the tubular shaft 4 is about 170 mm, such that the radial gap occupied by the helical brush is about 15 mm.

Still by way of indication, the tube 2 is 6 meters (m) long, for example.

The direction in which the brush 40 is wound around its shaft is naturally determined as a function of its direction of rotation, so that the brush acts as an Archimedes' screw suitable for moving substance from the upstream end towards the downstream end of the tube 2 in which it is contained.

All of the brushes have a screwpitch with the same handedness, but two adjacent shafts 4a, 4b are rotated in opposite directions as represented by arrows Ra and Rb, as described below.

Between the tube 2 and the tubular case 3 surrounding it, there is interposed an inflatable gasket 5 which is likewise wound helically.

By way of example, the gasket can be of flat section, being made of an "EPDM" type synthetic rubber which is initially wound under a vacuum around the tube 2 and subsequently allowed to expand automatically under the effect of atmospheric pressure. This type of inflatable gasket is well known.

It thus bears closely against the outer and inner walls of the tubes 2 and 3 respectively.

Once in place, this gasket defines a space that is in the form of an annular sheet, along which space the distillate can circulate as a counterflow to the direction in which the manure propagates within the central tube 2.

By means of this disposition, very good heat exchange is obtained between the heat-conveying liquid (the distillate) and the substance to be warmed (the manure).

As can be seen in the top right portion of FIG. 2, a set of disks 400 is provided inside each tubular shaft 4. The disks are engaged by means of respective central openings on an axial rod 401. They serve as ballast to compensate for the Archimedes' thrust generated by the heat exchanger on the shaft 4. In addition, they stiffen the tubular wall so that it can withstand the outside pressure from the manure.

Each rotary shaft 4 is driven by a driving sprocket 8 mounted on the end of an axle 41 which extends one of the ends of the shaft 4.

All of the driving sprockets 8a, 8b are placed at the same ends of the shaft 4 on which they are fitted, so that all of these sprockets lie in the same vertical plane.

The axles 41 are mounted and guided in rotation in appropriate bearings or ball bearings 70 mounted in a fixed frame element 7.

According to an important characteristic of the invention, each axle 41 includes a coupling member 42 which allows the shaft 4 to move a little in a radial direction relative to its driving sprocket 8.

By means of this disposition, the helical brush 40 centers itself automatically and freely inside the corresponding tube 2, thereby ensuring that motion is transmitted regularly, and brush wear is limited.

This coupling 42 which transmits rotation while leaving a certain degree of freedom in radial displacement is of known type.

By way of example, it comprises two complementary male/female parts having an outline that prevents relative rotation, e.g. a star shape, and interfitting with a certain amount of clearance.

The axle 41 passes through the corresponding end wall 20 of the tube 2 via an annular sealing ring 200 suitable for preventing manure from leaking therethrough.

The diagram of FIG. 4 shows how all of the shafts carrying the helical brushes are rotated using a single motor 9.

A single electrical motor and gear box unit is mounted at the top of the heat exchanger structure 7. It has an outlet sprocket 90 meshing with a drive chain 91. This chain passes in succession over a tensioning sprocket 80 and over deflector sprockets 81, 82 prior to passing over the series of driving sprocket 8 and a final deflector sprocket 83.

As can be see in FIG. 4, the chain 91 passes over substantially half of each sprocket 8 (i.e. over an angular sector of 180°), and it zig-zags from one sprocket to the next so that the sprockets 8a are driven in the opposite direction to the sprockets 8b.

The directions of rotation of the sprockets are represented by arrows in FIG. 4.

By means of this disposition, the manure is driven in opposite directions in any two adjacent tubes 2a, 2b.

FIG. 3 helps visualize the flow F of manure in an axial direction inside a tube 2 under the effect of the shaft 4 carrying the helical brush 40 rotating in direction R; it also serves to show the flow G of distillate at the periphery of the tube 2 inside the case 3 in the helical annular space defined by the inflatable gasket 5.

Advantageously, the gasket 5 can be wound in opposite-handed pitches over the two categories of tube 2a and 2b so as to take account of the manure flow direction and improve heat exchange.

An upwardly-directed fitting 23 is provided at the downstream end of each tube 2 to remove gas which accumulates in the tube, as represented by arrows K.

This removal takes place via the pipes $k_1$ and $k_2$ as already mentioned above with reference to FIG. 1.

As an indication, the shafts 4 can rotate at a speed of about 40 revolutions per minute (rpm).

The flow rates of manure and distillate through the heat exchanger are respectively about 1000 liters per hour (l/h) and 900 l/h.

Using a distillate whose temperature at the inlet to the heat exchanger is 110° C., it is possible to raise the temperature of the manure from 10° C. to 110° C. approximately; the distillate leaving the heat exchanger has been cooled down to a temperature of about 20° C.

The rotating brush serves to advance the sediment and the bubbles in the same direction and at the same speed as the manure itself; on reaching the downstream end of each tube, the sediment drops under gravity into the tube below while the bubbles vaporize and are removed.

Although the heat exchanger is designed for a particular application, namely treating manure, various other applications can naturally be found for it whenever there is a need for a fluid and foamy substance containing sediments and bubbles to be warmed, which substance would be difficult or even impossible to treat using conventional heat exchangers.

What is claimed is:

1. A heat exchanger for using a hot liquid to warm a cold substance that is fluid and foamy, containing solid particles and gas, the heat exchanger being characterized by the fact that it comprises a plurality of unit heat exchangers (1) connected in series, each constituted by a horizontal tube (2) having a heat conducting wall, in which the substance is caused to circulate from one end to the other, and a concentric tubular case (3) surrounding said tube (2) in which the hot liquid is caused to circulate from one end to the other in the opposite direction to the circulation of said substance, and that inside said tube (2) there is coaxially mounted a rotary shaft (4) carrying a helical brush (40) forming an Archimedes' screw thread that rubs against the inside wall of the tube (2) to ensure that the substance is transported therealong.

2. A heat exchanger according to claim 1, characterized by the fact that said unit heat exchangers (1) are disposed substantially in a common vertical plane one above another, with the substance circulating downwards, i.e. from the top unit heat exchanger to the bottom unit heat exchanger of the series, while the hot liquid circulates in the opposite direction, i.e. upwards.

3. A heat exchanger according to claim 1 or claim 2, characterized by the fact that the downstream end of said tube (2) has a gas removal fitting (23).

4. A heat exchanger according to any one of claims 1 to 3, characterized by the fact that said rotary shaft (4) is mounted inside the tube (2) via a floating mount, the shaft being centered automatically within the tube by the helical brush (40) bearing against the inside wall of the tube (2).

5. A heat exchanger for using a hot liquid to warm a cold substance that is fluid and foamy, containing solid particles and gas, the heat exchanger being characterized by the fact that it comprises a plurality of unit heat exchangers (1) connected in series, each constituted by a horizontal tube (2) having a heat conducting wall, in which the substance is caused to circulate from one end to the other, and a concentric tubular case (3) surrounding said tube (2) in which the hot liquid is caused to circulate from one end to the other in the opposite direction to the circulation of said substance, and that inside said tube (2) there is coaxially mounted a rotary shaft (4) carrying a helical brush (40) forming an Archimedes' screw thread that rubs against the inside wall of the tube (2) to ensure that the substance is transported therealong, wherein said rotary shaft (4) is mounted inside the tube (2) via a floating mount, the shaft being centered automatically within the tube by the helical brush (40) bearing against the inside wall of the tube (2), and the shaft (4) is rotated by means of a coupling member (42) which leaves the shaft with a certain amount of freedom to move radially.

6. A heat exchanger according to any one of claims 1 to 5, characterized by the fact that a helical gasket (5) is interposed between the tube (2) and its case (3) so as to channel the hot liquid and cause it to circulate in the form of a helical sheet.

7. A heat exchanger according to claim 6, characterized by the fact that said gasket is an inflatable tube of synthetic rubber.

8. A heat exchanger according to any one of claims 1 to 7, characterized by the fact that all of the helical brushes (40) have screw pitches with the same handedness, while pairs of adjacent shafts (4) are rotated in opposite directions.

9. A heat exchanger according to any one of claims 1 to 8, characterized by the fact that each of the shafts (2) carries a driving sprocket (8), with all of the shafts being driven by a motor (9) via a chain (91) engaging the set of sprockets (8).

10. A heat exchanger according to any one of claims 1 to 9, characterized by the fact that it serves to preheat liquid manure that is to be dehydrated by evaporation, the hot liquid being the distillate produced by the dehydration treatment.

* * * * *

UNITED STATES PATENT AND TRADEMARK OFFICE
CERTIFICATE OF CORRECTION

PATENT NO. : 6,513,580 B1
DATED : February 4, 2003
INVENTOR(S) : Jacques Bourdel It is certified that error appears in the above-identified patent and that said Letters Patent is hereby corrected as shown below:

<u>Column 8,</u>
Line 1, after the numeral "1", delete "or claim 2".
Lines 4-5, delete "according to any one of claims 1 to 3", and substitute -- according to claim 1 --.
Lines 29-30, delete "according to any one of claims 1 to 5", and substitute -- according to claim 1 --.
Lines 37-38, delete "according to any one of claims 1 to 7", and substitute -- according to claim 1 --.
Lines 41-42, delete "according to any one of claims 1 to 8", and substitute -- according to claim 1 --.
Lines 45-46, delete "according to any one of claims 1 to 9", and substitute -- according to claim 1 --.

Signed and Sealed this

Twenty-sixth Day of August, 2003

JAMES E. ROGAN
*Director of the United States Patent and Trademark Office*